United States Patent Office 3,251,245
Patented May 17, 1966

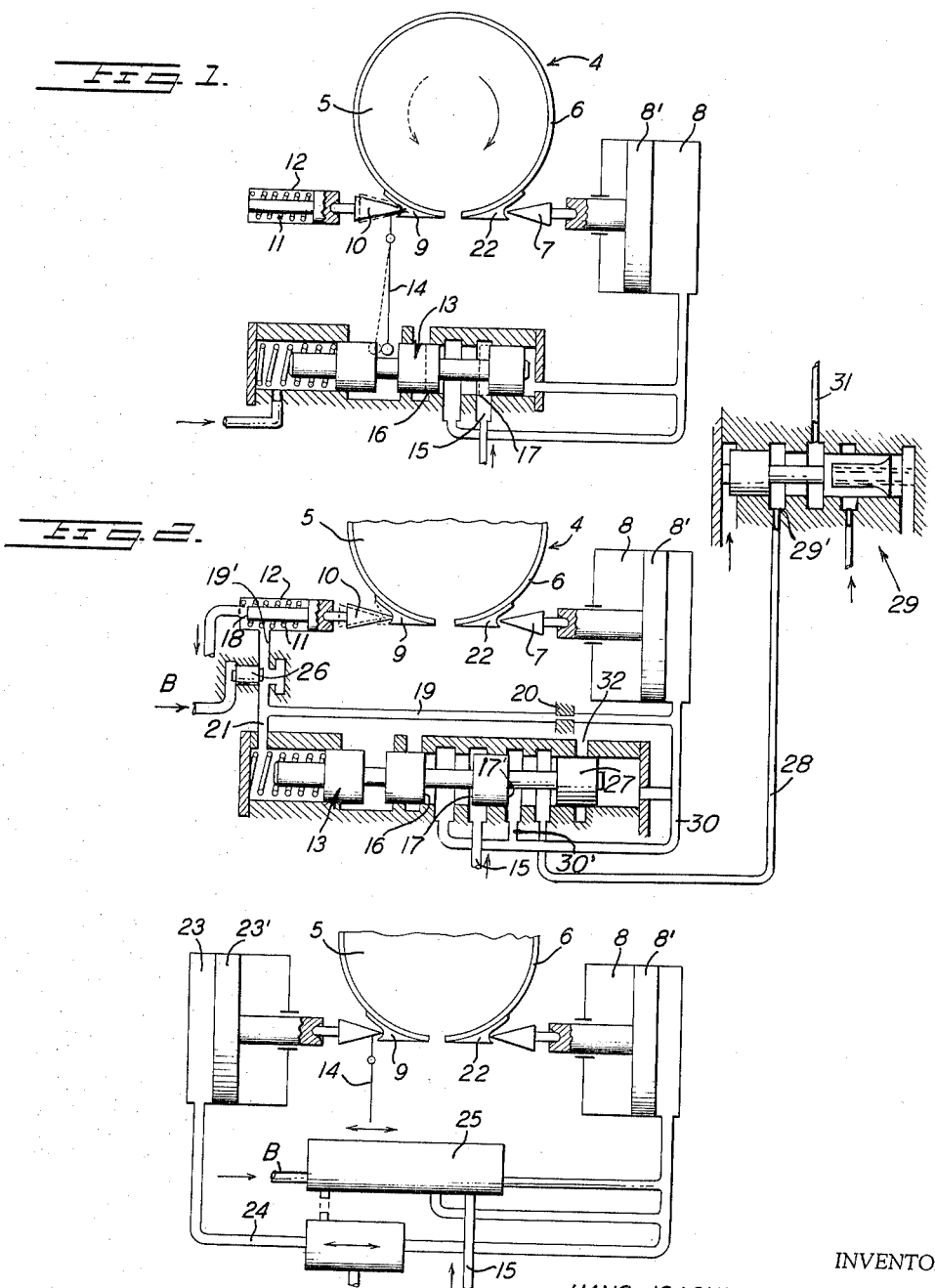

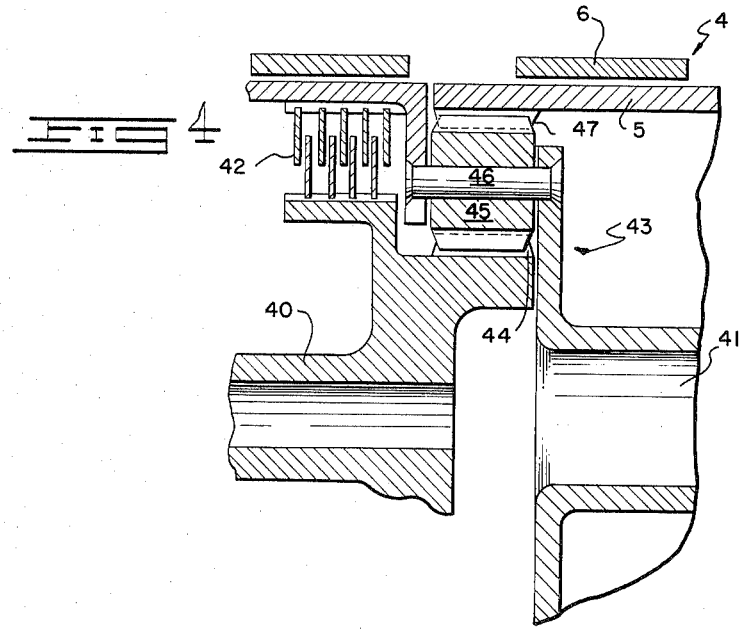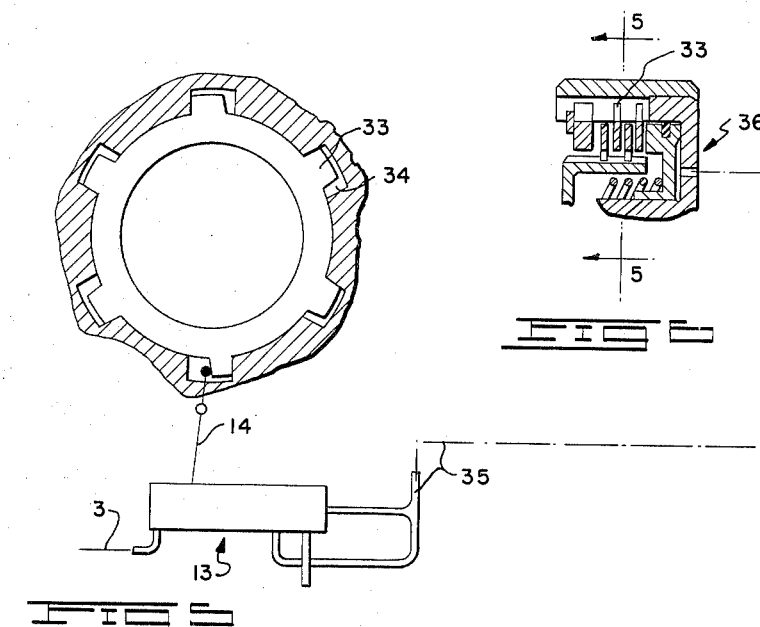

3,251,245
CONTROL ARRANGEMENT FOR FORCE-
LOCKING DEVICES
Hans-Joachim M. Foerster, Stuttgart-Bad Cannstatt, Germany, assignor to Daimler-Benz Aktiengesellschaft, Stuttgart-Unterturkheim, Germany
Filed Nov. 18, 1957, Ser. No. 697,217
Claims priority, application Germany, Nov. 20, 1956, D 24,324
25 Claims. (Cl. 74—751)

The present invention relates to an arrangement for shifting change-speed transmission, especially for motor vehicles which are adapted to be shifted by force-locking devices, such as friction clutches or friction brakes.

The present invention is of special significance for shifting planetary gears actuated by a servo-force and provided with a hydrodynamic unit connected in front of the planetary gear.

Change-speed transmissions of the type described hereinabove are known in the prior art in which servo-actuated shifting members, for example, friction disk clutches or brake bands are provided for the engagement of one or several engageable transmission steps or ratios by means of appropriate control members. In one known prior art construction, the servo members are controllable in dependence on the engine rotational speed. The purpose of such an arrangement is to avoid the need for a main clutch and to replace the same, so to speak, by the smooth gripping and soft engagement of the servo member.

During shifting of change-speed transmissions having different steps or transmission ratios, in general, it is appropriate during shifting back or down to a lower speed while giving gas to avoid shocks, to bring the engine by its own force to the rotational speed corresponding to the lower speed to be engaged after disengagement of the higher speed, and to engage the new lower speed only if the difference in rotational speed at a shifting member of the new speed has fallen to zero prior to the reversal of direction thereof. These requirements would be ordinarily fulfilled by suitable freewheeling devices known in the prior art, however, shifting by means of freewheeling devices has the principal disadvantage that transmission of a negative torque, i.e., braking of the vehicle by the engine is not possible thereby except if additional shifting members, such as releasable clutches or brakes, are provided therefor.

The present invention has as its main purpose to enable a shock-free shifting-back to a lower speed without this dual expenditure.

The present invention consists in that with the change-speed transmissions of the type mentioned hereinabove, the control members respond automatically to a reversal of torque at the transmission member operatively connected therewith or coordinated thereto and the shifting members are adapted to be shiftel in dependence on this reversal of torque, possibly by a servo force automatically from a freewheeling-like condition to a condition of complete engagement thereof. The control members are thereby influenced or controlled by impulses which are initiated during reversal of the direction of rotation at the shifting member.

The construction according to the present invention makes it possible that the shifting member of the new speed is initially only readied so to speak. Only if the engine in the meantime has caught up with the rotational speed difference between the shifted speeds, the full effectiveness of the shifting member is automatically released without any further shifting manipulation or engagement and therewith the shifting is completed.

The impulse for influencing or controlling the control member is obtained in connection with a friction disk clutch provided for shifting from one speed to another in that one of the friction disks of the clutch has a predetermined freedom of movement in the circumferential direction thereof and possibly is connected with the control member against a spring force. The particular friction disk, during reversal of the direction of rotation of the differential rotational speed thereby moves from one to the other end position thereof. This movement is transmitted to the control member and is utilized thereat for purposes of controlling a servo-force, for example, an oil pressure.

According to one embodiment providing a preferred solution in accordance with the present invention, an actuating member actuated by a servo-force, for example, a hydraulic brake cylinder, is provided at a brake serving the purposes of shifting the transmission and the servo-force, for example, the hydraulic pressure, is controlled by the control member in dependence on the reaction force occurring at the brake abutment or support. Use is made in connection therewith of the fact that the abutment force of the brake band on the fixed side thereof is larger or smaller by a predetermined factor depending on the direction of slippage than the known force of the opposite actuating member, for example, of the hydraulic brake cylinder.

Accordingly, it is an object of the present invention to provide a control arrangement for force-locking devices used in connection with shifting of a change-speed gear which provides the necessary versatility in the operating characteristics required of such device.

Another object of the present invention is to provide a control arrangement for a force-locking device in a change-speed transmission, used for purposes of shifting the transmission from one speed to another, which is simple in construction, relatively inexpensive in manufacture and which exhibits the characteristic features of a freewheeling device or one-way engaging means provided with means for rendering the freewheeling device or one-way engaging means ineffectual so as to enable the vehicle to be braked by the engine.

Still another object of the present invention is the provision of a control arrangement which utilizes a servo-force to initially merely ready the force-locking device for purposes of engagement prior to full engagement and in which full engagement of the force-locking device is automatically obtained in response to a reversal of torque or rotation which occurs in the transmission.

These and other objects, features and advantages of the present invention will become more obvious from the following description when taken in connection with the accompanying drawing which shows, for purposes of illustration only, three embodiments in accordance with the present invention, and wherein:

FIGURE 1 is a schematic cross-sectional view of a brake-actuating mechanism in accordance with the present invention, provided with a mechanical connection for the control member;

FIGURE 2 is a schematic cross-sectional view through a second embodiment of a brake actuating device in accordance with the present invention provided with a hydraulic connection for the control member;

FIGURE 3 is a schematic partial cross-sectional view of still another embodiment of a brake actuating device having an increased freewheeling effect; and FIGURE 4 is a partial schematic view of a planetary gear with which the brake actuating mechanism in accordance with the present invention may be used;

FIGURE 5 is a partial schematic cross-sectional view of still a further embodiment of a clutch actuating device in accordance with the present invention provided with a mechanical connection for the control member similar to FIGURE 1, and taken along line 5—5 of FIGURE 6; and FIGURE 6 is a partial cross-sectional view through a clutch adapted to be actuated by means of a control device in accordance with the present invention.

Referring now to the drawing, wherein like reference numerals are used throughout the various views to designate like parts, and particularly to FIGURE 1, reference numeral 4 generally designates therein a brake constructed as a band brake. The brake 4 includes a brake drum 5 operatively connected with or forming part of a rotatable element of a change-speed transmission which changes the transmission ratio thereof when held stationary by a brake and a brake band 6 of suitable construction and material. FIGURE 4 illustrates one possible example of a conventional planetary gear construction generally designated therein by reference numeral 43 which includes a sun gear 44, a ring gear 47 and at least one planet carrier 45 in meshing engagement with both the sun gear 44 and the ring gear 47 and carried by a planet carrier 46. The planetary gear is adapted to be locked up by means of a conventional clutch generally designated by reference numeral 42, while the drum-shaped member 5 attached to or formed integrally with the ring gear 47 is adapted to be braked by means of a brake band 6 controlled in accordance with the present invention as will be described more fully hereinafter. A shaft 40, for example the input shaft, is operatively connected with the sun gear 44 while a shaft 42, for example the output shaft, is operatively connected with the planet carrier 46. It is understood, however, that the present invention is not limited in its use to the particular planetary gear illustrated in FIGURE 4, which is shown herein only as one example that may be used with the present invention. The brake band 6 at the end 22 thereof is actuated by means of a knife-edge-like plunger member 7 from the piston 8' reciprocating in the hydraulic brake cylinder 8. The other end 9 of the brake band abuts by means of a similar knife-edge-like plunger member 10 against a spring 11 which is supported in an abutment or relatively stationary support 12. The spring 11 of the abutment 12 is matched and possibly adjusted to the step-like jump of the reaction force which occurs during reversal of the direction of rotation of the brake drum 5. This jump of the reaction force has its origin in the fact that with a reverse direction of rotation the abutment force is only about half as large as a result of the servo effect of the brake band. It may be appropriate to provide an adjustment for the spring force so that the matching thereof is possible within predetermined limits as well as any readjustments.

A control slide valve member generally designated by reference numeral 13 serves as control member for the working pressure in the brake cylinder 8 which control slide valve member 13 is connected by means of a mechanical linkage 14 with the spring-supported end 9 of the brake band. The linkage 14 may be constructed as a double lever or in any other appropriate manner.

As a result of the matching of the spring 11 in the abutment or support 12, the brake band end 9 has two different positions whereby it passes over during reversal in the direction of rotation suddenly and very rapidly from the one into the other position. These different positions are transmitted by the linkage 14 to the control slide valve member 13 which has a throttling effect in one position to provide only a relatively lower pressure in cylinder 8 whereas in the other position it renders completely free the supply of fluid to provide a relatively higher or full pressure in the brake cylinder 8 and therewith brings the brake 4 into full engagement in the latter position.

*Operation*

The manner of operation of the device illustrated in FIGURE 1 is as follows:

It is assumed that the brake drum 5 rotates at first in a counterclockwise direction corresponding to the arrow shown in dash lines. The impulse for engagement of the brake is now transmitted from any suitable actuating device through line 15 over the control slide valve member 13 to the brake cylinder 8. The control slide valve member 13 and the brake band end 9 with the linkage 14 are now in the position indicated in FIGURE 1 in dash lines. As a result of the position of the control slide valve member 13, as shown in FIGURE 1 in dash line, the control edges 16 and 17 thereof now adjust a pressure in the brake cylinder 8 of a relatively lower value, for example, an initial pressure of 0.5 atmospheric excess pressure by reason of the fact that the control edge 17 controls and throttles the inlet from the line 15 whereas the control edge 16 controls and enables a limited discharge to the outside of the control valve member, for example, into atmospheric pressure. The brake band is, therefore, only slightly engaged, i.e., surrounds the brake drum 5 only with a slight frictional force without the occurrence of a shock-like braking taking place, i.e., the brake drum 5 continues to rotate as before. If the engine in the meantime catches up with the rotational speed thereof so that after a certain time the brake drum 5 comes to a standstill, at this moment, the reaction force at the brake band end 9 suddenly increases in a jump-like manner. The spring 11 of the abutment 12 is now overcome and the plunger 10 is now forced by the brake band end 9 toward the left as viewed in FIGURE 1. The control slide valve member 13 is thereby simultaneously forced by the linkage 14 into the position thereof toward the right, i.e., into the position thereof shown in full lines in FIGURE 1. As a result of such movement of the control slide valve member 13, the control edge 16 now closes the discharge port and the full pressure prevailing in supply line 15 now reaches the brake cylinder 8 essentially without loss so that the brake may be fully engaged by the pressure in line 15 transmitted to cylinder 8.

FIGURE 2 shows the same brake 4 as in FIGURE 1 which again includes a brake drum 5 and a brake band 6. The brake band 6 is again actuated at the end 22 by the piston 8' slidable in brake cylinder 8. The plunger member 10 which is resiliently supported in the abutment 12 by means of spring 11, however, in this embodiment is constructed as a valve 18. The connection between the resiliently supported brake band end 9 and the control slide valve member 13 takes place in the embodiment according to FIGURE 2 by hydraulic means. The valve 18 is adjusted and matched by means of spring 11, in the same manner as described in connection with the embodiment of FIGURE 1, to the step-like jump of the reaction force and is normally maintained open. During reversal of direction of rotation of the brake drum 5, the valve 18 is closed as a result of the sudden force occurring at plunger member 10. A line 19 leads from brake cylinder 8 over a throttling device 20 to the valve 18 and from there into the discharge or any other region without pressure. A branch line 21 branches off line 19 which leads to the control slide valve member 13.

*Operation*

The manner and operation of the device according to FIGURE 2 is as follows:

As long as the valve 18 is in a position indicated in the drawing, an initial pressure of, for example, 0.5 atmospheric excess pressure is adjusted for the brake cylinder 8 in the manner described hereinabove by the control edges 16 and 17 of the control slide valve member 13. Depending on the amount of throttling 20, this pressure may flow off without hindrance through the opened valve 18 so that in line 19 no greater pressure than the initial pressure may build up. As soon as the brake drum 5 attempts to reverse its direction of rotation, the brake band end 9 is suddenly displaced toward the left into the position indicated in the drawing in dash line and thereby closes the valve 18. As a result of closure of valve 18, the pressure may now build up in the line 19 which now acts over branch line 21 on the control slide valve member 13 and thereby displaces the same toward the right, as viewed in FIGURE 2. As a result of such displacement of the control valve member 13 toward the right, the full pressure is now released to brake cylinder 8 and the brake 4 may thereby engage fully.

In some cases, it is also desirable to maintain the freewheeling effect of the brake even if shifting has already taken place. For that purpose, according to the embodiment of FIGURE 3, both ends 9 and 22 of the brake band 6 may be supported by two brake cylinders 8 and 23 of practically the same size. The two brake cylinders 8 and 23 are connected with each other by a connecting line 24. In that case, reversal of the direction of rotation of the brake drum 5 produces a superior force in the one or the other side so that the brake band 6 with the brake drum 5 moves toward the one or the other direction insofar as brake cylinders 8 and 23 permit such movement. The direction of flow in this connecting line 24 may serve for purposes of controlling a reducing valve 25 which is arranged in the supply line 15. The arrangement may thereby be so made that the reducing valve 25 causes in one position thereof a relatively lower initial pressure in the brake cylinders 8 and 23. If now the brake drum 5 reverses the direction of rotation thereof, i.e., if the direction of flow in the connecting line 24 is reversed, then the reducing valve 25 is fully opened and therewith the full pressure is released to the brake cylinders 8 and 23.

The same effect may be obtained in that the position of the brake band 6 is mechanically sensed and is directly transmitted to the reducing valve 25 by means of a linkage, for example, by means of a double lever 14. The double lever 14 may thereby be arranged at either brake band end 9 or 22.

It is also possible to insert an additional control valve member between the control slide valve member 13, for example, according to FIGURES 1 or 2, and the resiliently supported brake band end 9 which additional control valve member is then connected with the brake band end 9 mechanically, for example, by a double lever 14, on the one hand, and hydraulically with the control slide valve member 13, on the other. The movement of the brake band end 9 during increase of the reaction force in the abutment 12 is at first transmitted mechanically to the further control valve member which produces a pressure by means of a pressure line on the back side of the control slide valve member 13. The latter then releases, in the manner described hereinabove, the full working pressure for the brake cylinder 8 after having been previously adjusted only to an initial lower pressure.

FIGURES 5 and 6 illustrate a system similar to that of FIGURE 1 as used in connection with a conventional friction clutch. Similar parts in FIGURES 4 and 5 are again designated by reference numerals corresponding to those used in FIGURE 1. The friction disc clutch generally designated by reference numeral 36 (FIGURE 6) is provided with one friction disc 33 (FIGURES 5 and 6) having a predetermined freedom of movement in the circumferential direction thereof with respect to the grooves 34. One projection of the friction disc 33 is thereby operatively connected with a lever 14 which in turn is operatively connected with the control slide valve member 13 in the same manner as the lever 14 is connected with the control slide valve member 13 in FIGURE 1. A line 35 corresponding to the line leading from the control slide valve member 13 to the brake cylinder 8 of FIGURE 1 is provided in FIGURES 5 and 6 to selectively actuate the clutch 36 by means of the control system in accordance with the present invention.

It has also been found that it may be appropriate in certain cases, until termination of the shifting operation, to maintain a residual pressure on the clutch, such as clutch 42 of FIGURE 4, of the speed to be disengaged. This takes place in the aforementioned arrangements according to the present invention, for example in the embodiment of FIGURE 2 of the present application, in that the discharge lines of the control slide valve members serving for purposes of shifting the higher speeds, such as the line 31 of the control slide valve member generally designated by reference numeral 29 for the higher speed, are connected through the slide valve members 13 of the brakes for the lower speeds. Shifting in the control slide valve member 13 is thereby so selected that the initial pressure of the brake cylinder is connected together with the discharge output lines of the control slide valve members of the higher speeds. Such an arrangement is illustrated in FIGURE 2, in which the control slide valve member generally designated by reference numeral 13 is provided with a further piston section 27 at the right hand end thereof as viewed in FIGURE 2. The piston member 27 valves a line 28 leading to the control slide valve member generally designated by reference numeral 29 which controls the engagement and disengagement of the higher speed, as is well known. The line 31 thereby leads from the control slide valve member 29 to the actuating means for a higher speed. Normally, in conventional prior art hydraulic control systems for change-speed transmissions, the aperture 29' within the control slide valve member 29 would be connected directly with the discharge leading, for example, back to the sump. However, in FIGURE 2, the line 28 which terminates in the aperture 29' and which effectively constitutes the discharge line for the higher speed actuating means as controlled by the control slide valve 29 is adapted to be connected with the pressure prevailing within brake cylinder 8 by means of the control slide valve member 13. This is achieved by means of a branch line 30' which enables the application of the slight initial pressure prevailing in brake cylinder 8 when the control slide valve member 13 is in the position thereof illustrated in FIGURE 2, i.e., if the brake 4 is engaged with an initial predetermined slight engagement. Upon reversal of torque at the brake band end 9, as described hereinabove, the control slide valve member 13 moves toward the right whereby the control edge 17' closes the branch line 30' while the piston member 27 now places line 28 in communication with the discharge 32 so that the clutch for the higher speed is completely relieved of any pressure via lines 31, 28 and 32. Consequently, the initial pressure applied to the brake 4 during initial engagement thereof remains simultaneously as a residual pressure on the clutch or brake of the speed to be disengaged. As soon as the control slide valve member releases the full braking pressure, the aforementioned discharge lines are controlled and shifted to full discharge, i.e., to zero pressure and the clutch or brake may be relieved from the pre-existing initial pressure. Furthermore, it may be appropriate for many purposes to construct the freewheeling effect of the brake in such a manner as to be disengageable. This may be achieved in any suitable way disabling the control slide valve member 13 or the corresponding parts thereof by keeping the control slide valve member 13 in the right hand position thereof. For example, this may be achieved by applying from any suitable source an oil under pressure over line B to the left hand end of the control slide valve member 13 as indicated schematically in FIGURES 1, 3 and 5, or by interposing a valve member 26 within line section 19', similarly actuated by a pressure fluid over line B to effectively disable the control effect of discharge line 18. However, any other suitable mechanical or hydraulic control arrangement to selectively disable the freewheeling effect of the brake may also be provided, the particular structure described and shown herein by illustration only for exemplary purposes.

While I have shown and described several embodiments in accordance with the present invention, it is understood that the same is not limited thereto but is susceptible of many changes and modifications within the scope of the present invention, and I intend to cover all such changes and modifications as encompassed by the appended claims.

I claim:

1. A shifting arrangement for changing the transmission ratio of a change-speed transmission providing a plurality of transmission ratios and having a rotatable part adapted to reverse the direction of rotation thereof during the shifting operation, comprising force-locking shifting means for establishing at least one of said transmission ratios, auxiliary force means for actuating said shifting means, and control means for controlling said auxiliary force means in response to a reversal of direction of rotation of said rotatable part operatively connected therewith to thereby control said shifting means in dependence on said reversal by said auxiliary force means, said shifting means being adapted to be engaged in a first condition corresponding to a free wheeling condition thereof and in a second condition corresponding to complete engagement thereof, and said control means being operative to shift said shifting means from said first condition to said second condition upon said reversal of rotation, said shifting means being a brake band, and spring-loaded abutment means for supporting one end of said brake band against a relatively stationary part of said transmission, said spring means being matched to the force occurring in said shifting means during said first condition so as to be overcome by said reversal of rotation.

2. A shifting arrangement for changing the transmission ratio of a change-speed transmission of a motor vehicle provided with planetary gear means, the transmission ratios of which are adapted to be selectively established by an auxiliary servo force, comprising force-locking shifting means for engaging at least one of the speeds of said planetary gear means, one element of said planetary gear means being adapted to reverse the direction of rotation thereof during shifting, an auxiliary force for actuating said force-locking shifting means, and control means responsive to a reversal of torque at said one planetary gear element for controlling said auxiliary force to effect full engagement of said one speed, said shifting means being adapted to be engaged in a first condition simulating free wheeling and in a second condition corresponding to the fully engaged condition thereof, and said torque reversal responsive means automatically controlling said auxiliary force to automatically shift from said first to said second condition, said control means being controlled by an impulse produced at said shifting means during said reversal, and said force-locking shifting means including engageable friction disk means having one friction disk provided with a predetermined freedom of movement in the circumferential direction thereof.

3. A shifting arrangement according to claim 2, further comprising spring means supporting said one friction disk to produce an impulse for controlling said control means operatively connected with said one friction disk.

4. A shifting arrangement for changing the transmission ratio of a change-speed transmission of a motor vehicle provided with planetary gear means, the transmission ratios of which are adapted to be selectively established by an auxiliary servo force, comprising force-locking shifting means for engaging at least one of the speeds of said planetary gear means, one element of said planetary gear means being adapted to reverse the direction of rotation thereof during shifting, an auxiliary force for actuating said force-locking shifting means, and control means responsive to a reversal of torque at said one planetary gear element for controlling said auxiliary force to effect full engagement of said one speed, said force-locking shifting means being a brake including a brake actuating member, abutment means for supporting said brake actuating member in said transmission, and said control means being responsive to the reaction force occurring in said abutment means for controlling said brake actuating member by said auxiliary force.

5. A shifting arrangement according to claim 4, wherein said brake acutating member includes a brake band and a hydraulically actuated brake cylinder having a piston operatively connected with said brake band.

6. A shifting arrangement according to claim 5, wherein said abutment means includes a relatively stationary member, spring means for resiliently supporting one end of said brake band against said relatively stationary member, and means for connecting said one end with said control means.

7. A shifting arrangement according to claim 6, wherein said one end of said brake band has two end positions, and wherein said spring means includes a spring in said relatively stationary member which is correspondingly matched to the sudden reaction force caused by said reversal of said brake so that said one end passes over from one end position to the other during said reversal.

8. A shifting arrangement according to claim 7, wherein said auxiliary force is a fluid medium and wherein said control means includes a control slide valve member selectively adjusting the pressure of said hydraulic medium to a lower or higher value depending on the position of said one end.

9. A shifting arrangement according to claim 8, wherein said control slide valve member is operative to supply to said shifting means said high pressure during increase of said reaction force caused by said reversal of said brake.

10. A shifting arrangement for changing the transmission ratio of a change-speed transmission of a motor vehicle provided with planetary gear means providing several transmission ratios which are adapted to be selectively established, one of said planetary gear elements being adapted to reverse the direction of rotation thereof during shifting, comprising force-locking shifting means for engaging at least one of the speeds of said planetary gear means and operatively connected with said one planetary gear element, abutment means for resiliently supporting said force-locking shifting means in said transmission, an auxiliary force for actuating said force-locking shifting means, and control means responsive to the reversal of the direction of rotation of said one planetary gear element for controlling said auxiliary force to effect full engagement of said one speed.

11. A shifting arrangement according to claim 10, wherein said force-locking shifting means includes a brake band and said control means includes a control slide valve member, and a mechanical connection between said abutment means and said control slide valve member.

12. A shifting arrangement according to claim 10, wherein said force-locking shifting means includes a brake band supported at one end thereof by said abutment means and wherein said control means includes a control slide valve member, and hydraulic means for actuating said control slide valve member by the position of said brake band end.

13. A shifting arrangement according to claim 12, wherein said abutment means includes a spring-loaded valve so arranged that during an increase of the reaction force as a result of said reversal said valve is closed against the spring force thereof.

14. A shifting arrangement according to claim 13, wherein said control means includes a brake cylinder, a line including throttle means connecting said valve with said brake cylinder, and a branch line leading to said control valve member and interconnected in said first-mentioned line intermediate said valve and said throttling means.

15. A shifting arrangement according to claim 10, wherein said force-locking shifting means includes a brake band supported at one end thereof by said abutmnet means and wherein said control means includes two control slide valve members, means connecting said one end mechanically with one of said control slide valve members, and means for hydraulically connecting said one control slide valve member with the other of said control slide valve members.

16. A shifting arrangement according to claim 10, wherein said force-locking shifting means includes a brake band and wherein said control means includes essentially equally large brake cylinders each having a brake piston operatively connected with a respective end of said brake band, and a pressure line connecting said two cylinders.

17. A shifting arrangement according to claim 16, further comprising reducing valve means in said pressure line controlled by the respective positions of the two ends of said brake band.

18. A shifting arrangement according to claim 17, wherein said reducing valve means is mechanically connected with one of said two brake band ends.

19. A shifting arrangement according to claim 10, comprising control valve means for the upper speeds of said transmission having discharge line means, control valve means for the lower speeds of said transmission, said discharge line means including said last-mentioned control valve means to control the discharge line means for the upper speeds by the position of the control valve means of the lower speeds.

20. A shifting arrangement according to claim 19, wherein said last-mentioned control valve means are operative to produce a lower pressure and a higher pressure operative with the respective force-locking shifting means, and wherein said discharge line means are so connected with said last-mentioned control valve means that in the position thereof corresponding to said lower pressure said lower pressure prevails in said discharge line means and with the the transition to said higher pressure said discharge line means are reduced to zero pressure.

21. A shifting arrangement according to claim 10, further comprising means for selectively disabling the step-like effect of said shifting means.

22. A shifting arrangement according to claim 10, wherein said force-locking shifting means includes a brake band having two ends, wherein said abutment means includes two brake cylinders each containing a piston, and connecting means operatively connecting a respective piston with a corresponding one of said brake band ends, and wherein said control means includes a line interconnecting said two cylinders provided with adjustable reducing valve means and a control slide valve member, controlling the pressure of said auxiliary force constituted by a fluid medium.

23. A shifting arrangement according to claim 22, wherein said adjustable reducing valve means is controlled by the direction of flow of said fluid medium in said interconnecting line.

24. A shifting arrangement according to claim 22, further comprising linking means operatively connecting one of said brake band ends with said adjustable reducing valve means to control the latter by the position of said one end.

25. A shifting arrangement according to claim 10, wherein said control means includes two valves members, said auxiliary force being a hydraulic medium, means connecting one of said valve members with said shifting means, means mechanically connecting the other valve member with said abutment means to mechanically shift said other valve member by said abutment means during said reversal, and means interconnecting said two valve members with each other to hydraulically control said one valve member by the position of said other valve member.

References Cited by the Examiner

UNITED STATES PATENTS 2,645,137   7/1953   Roche _____ 74—754

DAVID J. WILLIAMOWSKY, *Primary Examiner.*

BROUGHTON G. DURHAM, SAMUEL SPINTMAN, DON A. WAITE, *Examiners.*

J. D. COFFELT, H. B. ROCKMAN, T. C. PERRY,
*Assistant Examiners.*